US011620453B2

(12) United States Patent
Lockett et al.

(10) Patent No.: US 11,620,453 B2
(45) Date of Patent: Apr. 4, 2023

(54) SYSTEM AND METHOD FOR ARTIFICIAL INTELLIGENCE DRIVEN DOCUMENT ANALYSIS, INCLUDING SEARCHING, INDEXING, COMPARING OR ASSOCIATING DATASETS BASED ON LEARNED REPRESENTATIONS

(71) Applicant: CS Disco, Inc., Austin, TX (US)

(72) Inventors: Alan Justin Lockett, Georgetown, TX (US); Ryan Connor Rollings, Austin, TX (US)

(73) Assignee: CS Disco, Inc., Austin, TX (US)

( * ) Notice: Subject to any disclaimer, the term of this patent is extended or adjusted under 35 U.S.C. 154(b) by 191 days.

(21) Appl. No.: 17/073,087

(22) Filed: Oct. 16, 2020

(65) Prior Publication Data

US 2022/0121823 A1 Apr. 21, 2022

(51) Int. Cl.
*G06F 40/30* (2020.01)
*G06F 40/12* (2020.01)
*G06F 40/10* (2020.01)

(52) U.S. Cl.
CPC .............. *G06F 40/30* (2020.01); *G06F 40/10* (2020.01); *G06F 40/12* (2020.01); *G06F 2207/4824* (2013.01)

(58) Field of Classification Search
CPC ........... G06F 40/30; G06F 40/10; G06F 40/12
See application file for complete search history.

(56) References Cited

U.S. PATENT DOCUMENTS

| | | |
|---|---|---|
| 6,192,360 B1 | 2/2001 | Dumais |
| 2002/0129015 A1 | 9/2002 | Caudill |
| 2009/0216693 A1 | 8/2009 | Rujan |
| 2010/0185659 A1 | 7/2010 | Bai |
| 2011/0295861 A1 | 12/2011 | Lacasse |
| 2012/0150836 A1* | 6/2012 | He ......................... G06F 16/951 |
| | | 707/E17.084 |
| 2018/0196800 A1* | 7/2018 | Volkovs .................... G06N 3/04 |
| 2018/0196873 A1* | 7/2018 | Yerebakan .............. G06N 7/005 |
| 2019/0065744 A1* | 2/2019 | Gaustad ................ G06F 21/562 |
| 2019/0318474 A1* | 10/2019 | Han ...................... G06V 10/764 |
| 2021/0350079 A1* | 11/2021 | Singh ................... G06F 16/3334 |
| 2022/0121823 A1* | 4/2022 | Lockett ................... G06F 16/35 |
| 2022/0165078 A1* | 5/2022 | Zhang .................. G06V 30/416 |

OTHER PUBLICATIONS

International Search Report and the Written Opinion for International Application No. PCT/US21/54930, dated Jan. 21, 2022, 9 pgs.

* cited by examiner

*Primary Examiner* — Kevin Ky
(74) *Attorney, Agent, or Firm* — Sprinkle IP Law Group

(57) ABSTRACT

Artificial intelligence based document analysis systems and methods are disclosed. Embodiments of document analysis systems may allow the manipulation of datasets and associated codes by determining representations for these codes or datasets based on a machine learning model. The codes or datasets can then be manipulated using the associated representations.

18 Claims, 5 Drawing Sheets

# SYSTEM AND METHOD FOR ARTIFICIAL INTELLIGENCE DRIVEN DOCUMENT ANALYSIS, INCLUDING SEARCHING, INDEXING, COMPARING OR ASSOCIATING DATASETS BASED ON LEARNED REPRESENTATIONS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to semantic analysis and understanding of electronic documents. In particular, this disclosure relates to the semantic analysis and understanding of potentially large corpora of documents including the use of machine learning, neural networks, transfer learning or predictive coding in document analysis. Even more specifically, this disclosure relates to the use of machine learning for the association of datasets in document analysis systems to, for example, search, index, filter, compare, combine or reuse such datasets.

BACKGROUND

In the modern world, the vast majority of documents that are being created, utilized and maintained are in electronic format. A number of different situations commonly arise that require an analysis or identification of certain relevant electronic documents from a relatively large pool of available electronic documents. These types of search problems crop up in a wide variety of contexts. For example, in litigation, an entity's documents may need to be reviewed in order to identify documents that may be relevant to one or more issues in a litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what is to be shared with opposite parties. Additionally, during the course of the litigation each party may continually review those documents produced by the opposing party to locate documents relevant to the case at hand.

Litigation thus represents a microcosm of a more general problem raised by the high volume, and increasing presence and use of, electronic documents across a variety of different contexts. Namely, how can a large volume of electronic documents be understood, reviewed, or searched, filtered, associated, etc. in order that documents relevant to a particular topic or user's interest may be located. To aid users in resolving these problems, a document analysis system may be provided in a given electronic context. A document analysis system is typically used to allow users to analyze, review, navigate or search the electronic information to return responsive electronically stored information.

Accordingly, there is constantly a need for improved systems and methods for document analysis to assist in the analysis, review, navigation, or search of such electronic documents in order to allow such document analysis systems to better aid users engaged in such tasks, including allowing users to better identify relevant electronic documents from a pool of available electronic documents.

SUMMARY

Attention is thus directed to the embodiments of document analysis systems and methods disclosed herein. In many cases, such document analysis systems may operate on datasets, or collections of documents. These datasets may be curated based on a variety of operations of functionality provided by such document analysis systems. As but one example, many applications, such as document review for e-discovery, involve the production of labels or codes for a corpus of data. One method, known as predictive coding, requires human reviewers to code (also referred to as label) a set of documents with the coded documents forming a dataset for machine learning that is used to train a predictive model that suggests codes for the remaining documents, with each suggested code having some degree of confidence or strength that may be indicated to the reviewer as a predictive score for the code. The repeated use of this type of application can thus generate a large number of datasets. As the size of the archive of datasets grows in a document analysis system there is a need to organize such an archive in order to find and filter these datasets for reference or reuse in such predictive coding.

The above example thus illustrates a basic problem that arises in the context of such document analysis systems. Namely, how can the datasets utilized in conjunction with these document analysis systems (regardless of the source of such datasets), be organized or associated such that these datasets can be searched, filtered, indexed, compared or otherwise manipulated by a document analysis system. Such functionality is difficult to achieve. While it would be desirable to identify datasets (or corpora) that would be useful to a user in a given context, it is difficult to assess the similarity between such datasets.

To continue with the above examples of types of datasets generated during predictive coding, while each of the datasets in such a context may have a code or label assigned to it, if the labels differ from dataset to dataset there is no obvious way to understand how these labels (and thus the associated datasets) are related to one other. The labels may have textual names, but these names may not be reflective of their purpose. As a result, there may be no way to organize the datasets associated with these labels except to analyze the documents that comprise each of the datasets (e.g., documents that have been labeled positively or negatively for each label). Tools for this purpose are lacking.

Embodiments as disclosed herein may address these deficiencies by providing document analysis systems adapted for determining representations (e.g., numeric representations) for datasets, where these representations may be used to manipulate these datasets, including the searching, filtering, indexing, comparison, etc. (collectively manipulated) of such datasets for a variety of purposes by the document analysis system. In particular, embodiments may employ machine learning techniques to determine numerical representations in a representation space defined by a machine learning model by training the representation machine learning model on the documents of the archive of datasets (or a subset of these datasets) utilized by the document analysis system. The documents of each dataset may for example, in a predictive coding scenario, comprise the documents comprising the positive signals for the dataset or the documents comprising the negative signals of the dataset. The numerical representation of each dataset in the representation space can then be extracted from the resulting trained representation machine learning model. These extracted representations may thus be used to manipulate the associated datasets or codes associated with such datasets.

In certain embodiments, for example, a representation assigner may utilize and train a parameterized (or parametric) machine learning model (e.g., a Logistic Regression, Linear Discriminant Analysis, Perceptron, Naive Bayes or Neural Network machine learning model) based on the documents of the datasets of the document analysis system. Specifically, in one embodiment, a deep neural network may be utilized and trained on the documents of the datasets of the document analysis system, such as the documents comprising the positive signals for the dataset or the documents comprising the negative signals of the dataset. The weights and the bias of the trained neural network associated with each dataset may be extracted from the trained neural network model and assigned to that dataset as the numerical representation of that dataset.

This numerical representation for a dataset can be used by the document analysis system for a variety of purposes to manipulate such datasets. For example, in one embodiment the document analysis system may utilize the representation of datasets to compare datasets to determine one or more datasets similar to a specified dataset.

Such a comparison may be especially useful in the context of predictive coding. To illustrate, in many cases in such predictive coding a user may desire to create or augment a code of interest for a corpus by utilizing previous codes (e.g., the models or datasets associated with such previously generated code) that may be associated with another (or the same) corpus. The user may, however, have little to no visibility into the applicability of these previous codes to the code of interest he wishes to create or augment. By using the numerical representations associated with these codes a similarity function may be employed whereby utilizing the comparisons function to determine a similarity measure between the codes of the document analysis a number of codes most similar to the code of interest may be determined and presented to a user. The user may then select one or more of the determined similar codes (e.g., the datasets associated with those codes) to employ in augmenting or boosting the code of interest. Even in cases where no documents of a particular corpus are coded, by coding some subset of the documents (e.g., as positive signals or negative signals) for an associated corpus a numerical representation of the code of interest may be determined and similar codes to the code of interest determined with less effort or investigation.

Thus, embodiments may facilitate the comparison of datasets to associated codes to relate previously coded datasets and trained models to existing corpora and employ these previously coded datasets or trained models in the context of predictive coding. Thus, embodiments may allow a user to bundle datasets in order to form an aggregate dataset. Accordingly, previously coded datasets and previously trained models can be reused to provide predictive scores for a new corpus with little or less human coding. Furthermore, the quality of this set of codes can be higher than the quality of predictive coding without such reuse due to the fact that the previously coded datasets may be much larger in scale or of higher quality. Moreover, by transferring datasets, coding decisions, or models from previous predictive coding applications (e.g., within a defined scope) the amount of labor required by predictive coding may be reduced and the efficiency of such coding improved.

In some embodiments, even in the absence of any positive or negative signals for a corpus associated with a code, that code may be assigned a numerical representation in the representation space. Such an assignment may be accomplished based on a feature set associated with that code and a proxy representation machine learning model trained on codes having a previously assigned numerical representation and an associated feature set. Such a feature set may comprise, for example, terms or other features extracted from a textual description associated with those codes.

To illustrate in more detail, in some embodiments a proxy representation assigner may train a proxy representation machine learning model (e.g., a parameterized machine learning model such as Logistic Regression, Linear Discriminant Analysis, Perceptron, Naive Bayes or Neural Network machine learning model) on the features and (numerical) representations associated with the datasets of the document analysis system to predict a point or location in the representation space associated with the representation model based on a set of features. Accordingly, this proxy representation model may be applied to a set of features associated with a code or label to predict a point or location in the representation space defined by the representation model based on the set of features associated with that code. This proxy representation can then be used to manipulate the associated code in association with other datasets of codes in the system using the extracted representations (or proxy representations) associated with those or other codes or datasets.

Thus, for example, when a new code or label is received (e.g., when that code or label is being defined by a user of a predictive coding system), a user may be prompted for, or otherwise provide, a set of features associated with that code. Based on those features, the proxy representation model can be applied and a proxy location in the representation space associated with the representation model obtained for the new code. This proxy representation for the new code may be used to leverage capabilities of the document analysis system associated with such representations for codes (e.g., datasets labeled with that code), even in the absence of any positive or negative examples associated with the new code and, importantly, without the need to re-train the original representation model (e.g., even in instances where positive or negative examples exist for the code). Thus, for example, a proxy representation for a code may be utilized to determine one or more other similar codes based on the representations associated with the other codes of the document analysis system. Such similarities may be useful to, for instance, allow a user to select one or more similar codes to facilitate the bundling of the datasets for those codes.

The representation or proxy representations associated with datasets of a document analysis system may thus be used for a variety of purposes. As discussed, as but one use, the representations (e.g., representation or proxy representation) may be used to determine similar representations (e.g., and thus datasets). Such an identification may allow the augmentation or combination of datasets, allowing better or more accurate models (e.g., classifiers) to be trained and utilized by document analysis systems.

As another usage, the representations generated for datasets may be used to perform clustering within the representation space in order to identify similar codes or to find regions of density with the representation space. The points in a representation space may be utilized as a map of the datasets existing with respect to a document analysis system. These maps, regions of density or similarity of datasets (e.g., associated with codes) may be used to make determinations or decisions regarding the development of classifiers that may serve common labeling needs, either across corpora or across tenants of a document analysis system. Or, more generally, to perform data mining on the corpora themselves such that organizations may better understand their datasets or the composition of those datasets.

As yet another possible usage of representations of datasets, these datasets may be used to identify a drift of datasets over time. For example, if the representation of a code or dataset at a first time differs in a significant amount from the representation of that code or dataset at a second time, or two codes or datasets were associated with similarly located representations begin to drift apart it may indicate an issue with the review or coding of such datasets or something else amiss with those datasets or codes, or the review of such datasets or codes.

Embodiments as presented herein may thus have a number of advantages. Specifically, embodiments may employ techniques from machine learning in order to assign to each code or label (or dataset associated therewith) a numeric representation that can be used in order to search or index an archive of supervised labels associated with datasets in a document analysis system. Further, embodiments may provide various uses of these representations in order to improve the operations of certain tasks of document analysis, in particular the task of combining datasets built on different corpora to serve a common purpose.

Thus, the efficiency of computerized document review and analysis and other tasks involving the generation of an archive of supervised datasets whose base data is of a similar character may be improved. Some of the advantages of embodiments may stem from the fact that embodiments may provide speed advantages due to the fact that machine coding recommendations are available faster (potentially immediately) and may be more accurate due to the reuse of previous coding decisions. These machine coding recommendations may be accurate and rapidly produced even on small corpora by leveraging the "knowledge" gleaned from other datasets.

In one embodiment, a system for document analysis may include a data store, comprising a corpus of electronic documents. The document analysis system can obtain a first set of codes, where each code is associated with a dataset comprising a positive signal or a negative signal for the code and the positive signal or negative signal is associated with an electronic document of the corpus of electronic documents. The document analysis system trains a representation model using each of the first set of codes, wherein training the representation model comprises training a first machine learning model using the datasets associated with each of the first set of codes such that the representation model is adapted to predict membership in one or more of the first set of codes.

A representation is extracted from the representation model for each of the first set of codes, wherein each extracted representation for a respective code is in a representation space defined by the representation model and is stored in association with that respective code. At some point, the document analysis system can receive a first code of interest. A first representation associated with the first code of interest is obtained and compared with a second code to determine a similarity between the first code of interest and the second code, wherein the comparison applies a similarity function associated with the representation space to the first representation associated with the first code of interest and a second representation associated with the second code.

In some embodiments, the first machine learning model is a parametrized model and the extracted representation for the respective code is based on one or more parameters of the parametrized model associated with the respective code. The parametrized model may be, for example, a neural network, and the one or more parameters can include a weight or bias of the neural network.

In certain embodiments, the document analysis system may obtain a set of training codes of the first set of codes, where each training code is associated with a set of features and the respective extracted representation. A proxy representation model can be trained using each of the set of training codes, wherein training the proxy representation model comprises training a second machine learning model using the set of features associated with each of the set of training codes such that the proxy representation model is adapted to determine a proxy representation in the representation space based on the set of features.

A second code of interest and a set of features associated with the second code of interest can be received by the document analysis system. The proxy representation model can be applied to determine the proxy representation for the second code of interest based on the set of features and the second code compared with the second code of interest to determine a similarity between the second code and the second code of interest, wherein the comparison applies the similarity function associated with the representation space to the second representation associated with the second code and the proxy representation associated with the second code of interest.

In one embodiment, the second machine learning model is a regression model. In particular embodiments, the set of features comprises a text description.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1A:
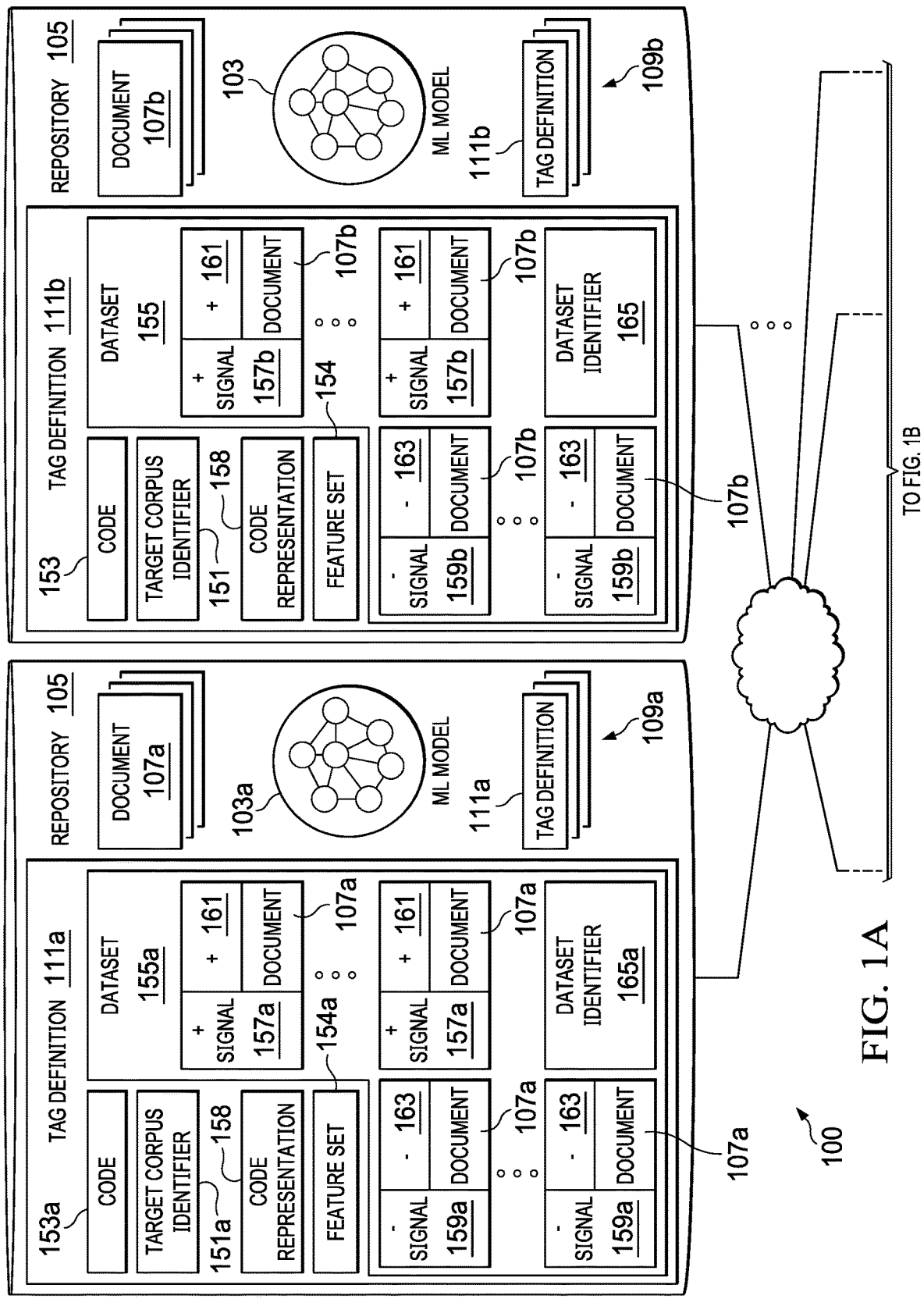
FIGS. 1A and 1B are a block diagram of one embodiment of an architecture including a document analysis system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in detail, it may be helpful to discuss some context around document analysis systems. A document analysis, document review, information retrieval, or search system (which all will be utilized here substantially interchangeably) is a computer system used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, content, etc. and may include objects such as files of almost any type including documents for various editing applications, emails, workflows, etc.

As discussed, document analysis systems may be used to assist in the analysis, review, navigation, or search of electronic documents in order to allow such document analysis systems to better aid users engaged in such tasks, including allowing users to better identify and interact with relevant electronic documents from a pool of available electronic documents. In many cases, such document analysis systems may operate on datasets, or collections of documents. These datasets may be curated based on a variety of operations of functionality provided by such document analysis systems. As but one example, many applications, such as document review for e-discovery, involve the production of labels or codes for a corpus of data. One method, known as predictive coding, requires human reviewers to code (also referred to as label) a set of documents with the coded documents forming a dataset for machine learning that is used to train a predictive model that suggests codes for the remaining documents, with each suggested code having some degree of confidence or strength that may be indicated to the reviewer as a predictive score for the code. The repeated use of this type of application can thus generate a large number of datasets. As the size of the archive of datasets grows in a document analysis system there is a need to organize such an archive in order to find and filter these datasets for reference or reuse in such predictive coding.

The above example thus illustrates a basic problem that arises in the context of such document analysis systems. Namely, how can the datasets utilized in conjunction with these document analysis systems (regardless of the source of such datasets), be organized or associated such that these datasets can be searched, filtered, indexed, compared or otherwise manipulated by a document analysis system. Such functionality is difficult to achieve. While it would be desirable to identify datasets (or corpora) that would be useful to a user in a given context it is difficult to assess the similarity between such datasets.

To that end, among others, embodiments as disclosed herein may provide document analysis systems adapted for determining numerical representations for datasets, where these numerical representations may be used to manipulate these datasets, including the searching, filtering, indexing, comparison, etc. of such datasets for a variety of purposes by the document analysis system. In particular, embodiments may employ machine learning techniques to determine numerical representations in a representation space defined by a representation machine learning model by training the machine learning model on the documents of the archive of datasets (or a subset of these datasets) utilized by the document analysis system. The numerical representation of each dataset in the representation space can then be extracted from the resulting trained representation machine learning model.

This numerical representation for a dataset can be used by the document analysis system for a variety of purposes to manipulate such datasets. For example, in one embodiment the document analysis system may utilize the representation of datasets to compare datasets to determine one or more datasets similar to a specified dataset. Such a comparison may be especially in the context of predictive coding to augment datasets by augmenting or boosting one code with another code.

In some embodiments, based on the numerical representations assigned to a dataset and features associated with those datasets, a proxy representation model may also be trained. The proxy representation model can thus be trained to predict a numerical representation for a dataset (e.g., even an empty dataset that may be associated with a new code or label) based on a set of features associated with the dataset. Specifically, the proxy representation model may be a machine learning model trained based on the numerical representations determined for datasets based on the representation model, and a set of features associated with each of those datasets. The proxy representation model can thus determine a proxy representation based on a set of features for a data set. In this manner, the proxy representation determined by application of the proxy representation model to the set of features of a dataset may be a representation in the same representation space defined by the representation model. Accordingly, the proxy numerical representation determined for a dataset may be usefully applied in conjunction with the numerical representations as determined for datasets based on the representation model, allowing the dataset associated with such a proxy representation to be usefully manipulated in association with the other datasets by approximating a representation for that dataset in the same representation space defined by the representation model.

The representations (e.g., including proxy representations) associated with datasets of a document analysis system may thus be used for a variety of purposes. For example, similar datasets may be identified. This may allow the identification of similar datasets (or codes or labels associated with such datasets) to a user for selection in the augmentation or combination of datasets. Such a user may be particularly applicable in the context of document analysis systems utilized in predictive coding applications or the like. Other uses may include the mapping of codes (e.g., based on their associated datasets) to perform clustering or density analyses for a variety of applications, including data mining or analysis regarding such datasets or associated codes.

It will now be useful to illustrate embodiments of such document analysis systems in more detail. It should be noted that these embodiments may be usefully applied in the context of document analysis systems that are utilized for predictive coding, and it is in such a context that embodiments will be described. It will be realized, however, that embodiments may be usefully applied in document analysis systems employed for a variety of other uses and that the descriptions of embodiments given herein with respect to predictive coding are given by way of example only without loss of generality and applicability to these other contexts.

Figure 1B:
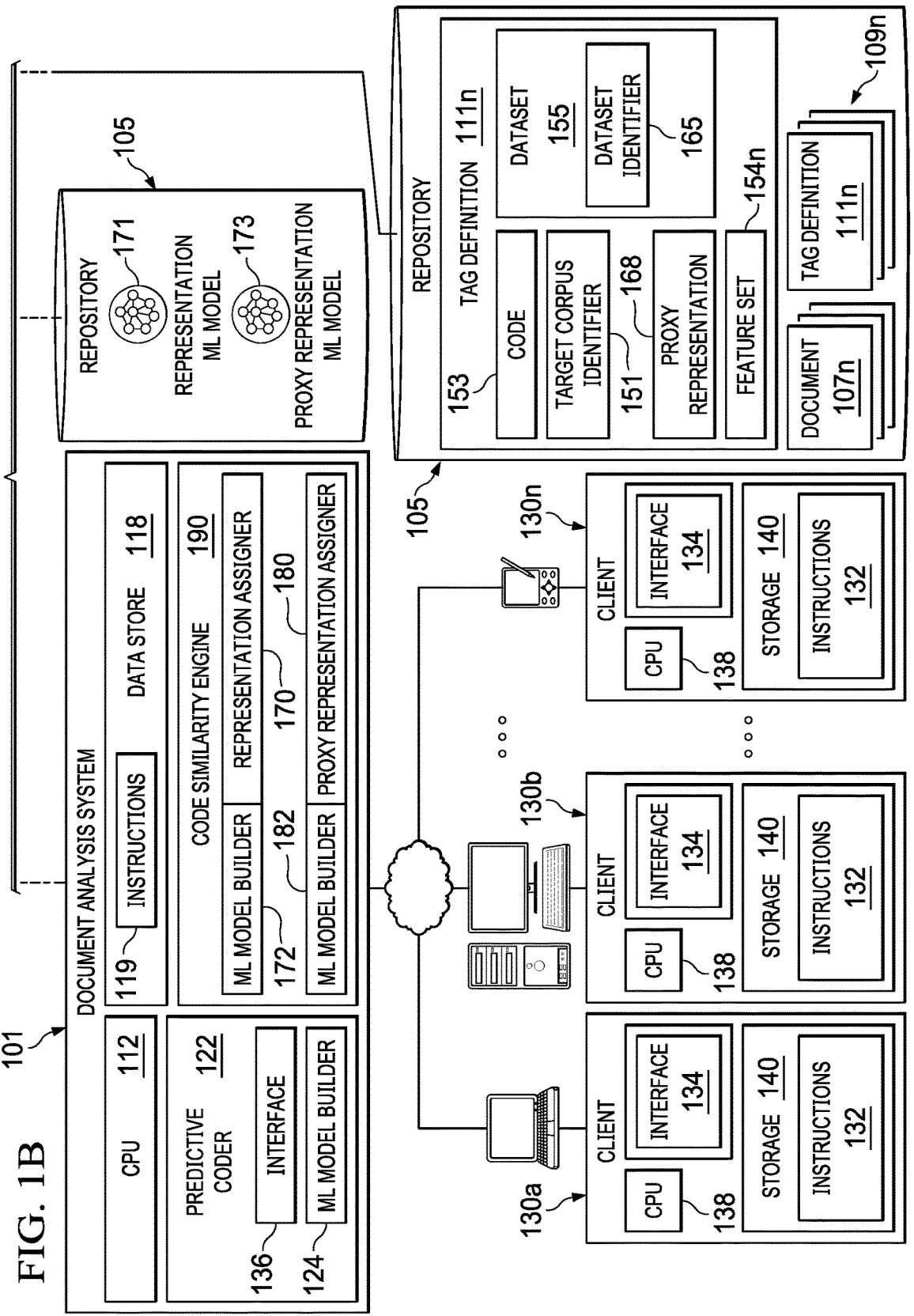

Looking then at FIGS. 1A and 1B, a block diagram of one embodiment of a document analysis system that allows for manipulation of represented datasets is depicted. The document analysis system 101 is part of computing environment 100 including one or more repositories 105, document analysis system 101, and one or more client computers 130. Repository 105 may comprise a file server or database system or other storage mechanism remotely or locally accessible by document analysis system 101 which, according to an embodiment, may be almost any SQL or NoSQL platform such as MongoDB, Elasticsearch or the like. Repository 105 may store documents 107 that document analysis system 101 may allow users accessing the document analysis system 101 to review (e.g., navigate, search, code, etc.). The documents 107 of the repository 105 may comprise one or more corpora 109. Thus, documents 107a may comprise one corpus 109a, documents 107b may comprise another corpus 109b, documents 107n another corpus 109n, etc. The corpora may correspond to, for example, different matters in a litigation context, different divisions or corporate entities in a business instance, or some other division or documents 107.

In the depicted embodiment document analysis system 101 may include one or more (virtual or physical) servers or other type of computing devices utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media or the like. Document analysis system 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide predictive coder application 122 and code representation engine 190. Predictive coder application 122 may be implemented on the same computing systems or can be distributed across multiple computing systems, platforms or physical or virtual servers. Again, it will be noted here that while embodiments described and depicted herein may include a deployment of a document analysis system on a physical computing device other embodiments may include the document analysis system deployed as a service on, for example, a cloud computing environment or otherwise deployed without loss of generality.

Client computer systems 130 may include components similar to those of the server of document analysis system 101, such as CPU 138 and data store 140. Additionally, client computer system 130 may include executable instructions 132 to provide user interface 134 that allows a user to interact with document analysis system 101 to review the documents 107 of the corpus 109. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the predictive coder 122, which may be, for example a web services interface, an Application Programming Interface (API) or another type of interface.

Again, those skilled in the art will appreciate that document analysis system 101 shown in FIGS. 1A and 1B are merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 130 may include any suitable desktop computer, laptop, mobile device, server or other computing system.

The document analysis system 101 may provide predictive coding capabilities to users reviewing the documents 107 of a corpus 109 through predictive coder 122 (e.g., through interface 134). Using an interface (e.g., interface 134) a user at a client device 130 may define a code in association with an associated (target) corpus 107a, 107b, 107n. When a user defines such a code for a corpus 109, there is a subset of documents of this target corpus that should be categorized together and assigned this code. The subset of documents 107 of the target corpus can be referred to as a tag.

Predictive coder 122 may thus be adapted to generate a score reflective of a determination of a likelihood or confidence that a document of the target corpus 109 belongs to a tag (and thus should be assigned the code). To generate such a prediction, embodiments of a document analysis may utilize a tag definition to allow a model for determining such predictions to be generated. In particular, a user may define a code (e.g., label) in association with a particular target corpus 109 using an interface 136 of the predictive coder 122 (e.g., accessible through interface 134). The definition of the code by the user may create an associated tag definition 111 at the document analysis system with an identification of the target corpus 109 of documents 107 and the defined code. The definition of a code may also include a set of features associated with the code, such as a textual description or the like.

Accordingly, when a user defines such a code, a tag definition 111 for that code may be created by the predictive coder 122 in association with the target corpus 109. The tag definition 111 may include a corpus identifier 151 identifying the target corpus and the defined code (or label) 153 for the tag (e.g., the code assigned to documents that are part of that tag). The tag definition 111 may also include any features 154 provided by the user (or otherwise determined) when defining the tag. The tag definition 111 may also include a dataset 155 that includes positive signals 157 for the tag and negative signals 159 for the tag. The dataset 155 may also include a dataset identifier 165 that allows the dataset (e.g., set of positive and negative signals 157, 159) to be identified as a group. The positive signals 157 include a document 107 (or reference thereto) and an annotation 161 indicating that the associated document 107 belongs to the tag (e.g., as indicated by the document 107 being manually coded with the code 153 by a human user). The negative signals 159 also include a document 107 (or reference thereto) and an annotation 163 indicating that the associated document 107 does not belong to the tag (e.g., as indicated by the document being manually coded as not being assigned the code 153 by a human user).

To illustrate, tag definition 111a may be defined for code 153a and may be associated with corpus 109a though target corpus identifier 151a. Tag definition 111a includes features 154a defined for the code 153a when the user was defining the code 153a. The tag definition 111a may also include dataset 155a identified by dataset identifier 165a and having positive signals 157a and negative signals 159a associated with documents 107a of the target corpus 109a. Each positive signal 157a may include an associated document 107a (or a reference to such a document 107a) and a (positive) annotation 161 that the associated document belongs to the defined tag (e.g., has been associated with the code 153a, such as by a human code or otherwise). Conversely, each negative signal 159a may include an associated document 107a (or a reference to such a document 107a) and a (negative) annotation 163 that the associated document 107a does not belong to the defined tag (e.g., has been indicated as not being associated with the code 153a, such as by a human code or otherwise).

ML model builder 124 of the predictive coder 122 may generate or train an ML model 103 to generate predictive scores for each tag definition 111. Specifically, for each tag definition 111 the ML model builder 124 may train an associated ML model 103 based on the dataset 155 associated with that tag definition 111 (e.g., the positive signals 157 and negative signals 159 of the dataset 155). For example, ML model builder 124 may train ML model 103a for tag definition 111a based on positive signals 157a and negative signals 159a of dataset 155a. The training of such ML models 103 may, for example, occur at different intervals based on criteria that may be associated with the corpus 109 with which the tag definition 111 is associated (such as newly received positive or negative signals being added to a dataset 155 of the tag definition 111 (e.g., a human has coded additional document), timing criteria (e.g., every day, weekly, etc.), or some other criteria. The training of such ML models is described in U.S. patent application Ser. No. 16/167,205 entitled "Methods and Apparatus for Asynchronous and Interactive Machine Learning Using Attention Selection Techniques" by Lockett incorporated herein by reference in its entirety for all purposes.

Thus, tag definition 111 can be associated with a corpus 109 and ML model 103 trained on the dataset 155 of the tag definition 111 to generate predictive scores for the documents 107 of the associated target corpus 109, with respect to the code 153 of that tag definition 111. In other words, a generated predictive score may indicate a likelihood that an associated document 107 may belong to the tag (and should thus be assigned the associated code 153). The predictive scores for the tag definitions 111 for the documents 107 of the associated corpus 109 can be presented to the user through the interface (e.g., interface 134) and feedback (e.g., coding decisions, including additional positive or negative signals) may also be received through interface 134 and used to, for example, update the datasets 155 associated with each tag definition 111.

As discussed, it is desired that codes 153 utilized in conjunction with these document analysis systems (e.g., by virtue of their associated datasets 155) be organized or associated such that these datasets can be searched, filtered, indexed, compared or otherwise manipulated by the document analysis system 101. However, this may be difficult. While each of the datasets 155 is associated with a code 153, if the codes 153 differ from dataset 155 to dataset 155 there is no obvious way to understand how these codes 153 are related to one another. The codes 153 may have textual names but these names may not be reflective of their purpose. As a result, there may be no way to organize the datasets 155 associated with these codes 153.

Accordingly, embodiments of document analysis system 101 includes a code similarity engine 190 having a representation assigner 170 that can determine numerical representations 156 associated with codes 153 based on their datasets 155, where these numerical representations 156 may be used to manipulate these datasets 155, including the searching, filtering, indexing, comparison, etc. (collectively manipulated) of such datasets 155 for a variety of purposes by the document analysis system 101.

In particular, representation assigner 170 may train a representation machine learning model 171 using machine learning model builder 172, where the machine learning model 171 may be used to determine numerical representations 156 in a representation space defined by machine learning model 171. The representation machine learning model 171 is trained on documents 107 comprising datasets 155 (e.g., the positive signals 157 for the dataset or the documents 107 comprising the negative signals 159 of the dataset 155) of (e.g., all of a subset of) tag definitions 111 utilized by the document analysis system 101. The numerical representation 158 associated with each tag definition 111 (and thus code 153 of the tag definition) in the representation space defined by the representation model 171 can then be extracted from the resulting trained representation machine learning model 171. The numerical representation 158 is then stored in association with the code 153 in the tag definition 111.

To express this concept mathematically, let $\{C_i\}_{i=1\ldots N}$ be a finite collection of corpora, where each corpus $C_i = \{d_{i,j}\}_{j=1\ldots M_i}$ is a finite collection of data items $d_{i,j}$. For each corpus $C_i$, let $L_i = \{T_{i,k}\}_{k=1\ldots K_i}$ be a collection of labels on the corpus where each label $T_{i,k} \subseteq C_i$ is a subset of the corpus. A data item $d_{i,j}$ has a label $T_{i,k}$ if $d_{i,j} \in T_{i,k}$. In this case it is also that $d_{i,j}$ is a positive example of $T_{i,k}$. Further, let $U_i = \{N_{i,k}\}_{k=1\ldots K_i}$ be a collection of negative examples for corpus $C_i$ such that the intersection $T_{i,k} \cap N_{i,k}$ is empty. Then if $d_{i,j} \in N_{i,k}$, it is said that $d_{i,j}$ does not have the label $T_{i,k}$ or that $d_{i,j}$ is a negative example for $T_{i,k}$. If $d_{i,j} \notin T_{i,k}$ and $d_{i,j} \notin N_{i,k}$ then $d_{i,j}$ is not labeled for $T_{i,k}$ and its status with respect to the label is unknown. A positive (respectively negative) example may be interchangeably referred to as a positive (respectively negative) signal.

A representation space can be defined for these sets of data items. Let (R, d) be space, to be called the representation space, where R is a set and d: R×R→[0, ∞) is a nonnegative function of two inputs called the similarity function for R that satisfies the triangle inequality $d(x,z) \leq d(x,y)+d(y,x)$. Many embodiments are possible. For example, d might be a metric, in which case the representation space is a metric space. Or, d might be a pseudometric rather than a metric by weakening the positivity requirement on metrics; or, d might be a divergence, weakening the symmetry requirement of metrics; or, strengthening rather than weakening, d might be induced by the norm of a normed vector space. In certain embodiments, any representation that has the basic property of allowing comparison of two elements of R using a 2-ary nonnegative function d satisfying the triangle inequality may be utilized.

Accordingly, embodiments of representation assigner 170 may utilize an assignment function $\alpha(i,k) \in R$ that assigns to each label $T_{i,k}$ a representation $r = \alpha(i,k) \in R$. This assignment function is generated by the representation assigner 170 based on the positive and negative examples $T_{i,k}$ and $N_{i,k}$ so that $\alpha(i, k) = \alpha(T_{i,k}, N_{i,k})$.

Thus, representation assigner 170 may place the dataset 155 for a code 153 (e.g., the positive signals 157 or the negative signals 159 of the dataset 155 associated with the tag definition 111 including code 153) into this representation space to determine the representation 158 for that code 153 based on the associated dataset 155. This allows representations 158 (and thus the datasets 155, codes 153 or tag definitions 111 associated with those representations 158) to be compared based on the similarity function d to generate a quantitative measure (e.g., a number between 0 and 1, etc.) of similarity.

To determine these numerical representations 158 for each code 153 associated with each tag definition 111, representation assigner 170 may utilize and train a representation machine learning model using ML model builder 172. In certain embodiments, for example, ML model builder 172 may utilize and train a parameterized (or parametric) representation machine learning model 171 (e.g., a Logistic Regression, Linear Discriminant Analysis, Perceptron, Naive Bayes or Neural Network machine learning model) based on the documents 107 of the datasets 155 of tag definitions 111 of the document analysis system 101. The parameters of the trained parameterized representation machine learning model 171 associated with each tag definition 111 (e.g., the dataset 155 of each tag definition 111) can then be extracted or converted to the numerical representation 158 and assigned to the tag definition 111 and associated code 153 as the numerical representation 158 of that code 153.

As an instance of assignment generation, a parameterized machine learning model $M(x; \theta)$ is trained to predict membership of a data item x in the labels $T_{i,k}$ for all $T_{i,k}$ simultaneously. Then the assignment of $T_{i,k}$ to the representation space is extracted from the learned model parameters $\theta$ using an extraction function $h: \theta \rightarrow R$ so that $\alpha(i,k) = h(\theta)$.

Specifically, in one embodiment, a deep neural network may be utilized and trained on the documents 107 of the datasets 155 of each of (or a subset of) the tag definitions 111 of the document analysis system 101, such as the documents 107 comprising the positive signals 157 for the dataset 155 or the documents 107 comprising the negative signals 159 of the dataset 155 for each tag definition 111. This training process results in a neural network representation model 171 comprising nodes adapted to determine if a document should be classified according to one or more the tag definition 111 whose data was used to train the representation model 171. The weights and biases of the representation model 171 may thus be adapted to discern or contrast the tag definitions 111 (e.g., the datasets associated therewith). Accordingly, the weights and the bias of the trained neural network representation model 171 associated with each dataset 155 for a tag definition 111 and associated code 153 may be extracted from the trained neural network representation model 171 and the numerical representation 158 assigned to the tag definition 111 and associated code 153 based on those weights and the biases. In this manner, by training a neural network representation models 171 for each of the tag definitions 111 and associated codes 153 a numerical representation 158 for each of those tag definitions 111 and codes 153 may be determined from such a representation model 171.

Again to depict embodiments mathematically, in certain embodiments the model $M(x; \theta)$ utilized by ML model builder 172 is a deep neural network. In general, such a network can be described as first applying a filter function $g(x; \theta_1)$ followed by logistic regression $$f_{i,k}(r; \theta_2) = \frac{e^{w_{i,k} \cdot r + b_{i,k}}}{\sum_{i'=1}^{N} \sum_{k'=1}^{K_i} e^{w_{i',k'} \cdot r + b_{i',k'}}}$$

where $\theta_2 = (w_{i,k}, b_{i,k})_{i=1 \ldots N, k=1 \ldots K_i}$, $f_{i,k}(r; \theta_2) = d(r \oplus 1, w_{i,k} \oplus b_{i,k})$, where $\oplus$ is dimensional concatenation (i.e., f is a similarity function—that is, the last layer of a neural network in general applies a similarity function.

Thus, $M(x; \theta) = f(g(x; \theta_1), \theta_2)$ may be the overall neural network model. In this case, one embodiment of representation assigner 170 assigns $\alpha(i,k) = (w_{i,k}, b_{i,k})$, where $w_{i,k}$ is known for neural networks as the weights for label $T_{i,k}$ and $b_{i,k}$ as the bias.

As will be discussed, once the numerical representation 158 associated with a tag definition 111 and code 153 is determined, this numerical representation 158 for the code 153 can be used by the document analysis system for a variety of purposes to manipulate such datasets. For example, the similarity function for the representation space may be applied to the numerical representations 158 to determine which codes are most similar to one another. Thus, in one embodiment the document analysis system may utilize the representation 158 associated with codes 153 to compare codes 153 to determine one or more datasets similar to a specified dataset for the purposes of boosting a particular code. Clustering may also be performed on the numerical representations 158 in the representation space to glean insights into the code 153 (e.g., and tag definitions 111 or datasets 155) being constructed or utilized by the users of the document analysis system 101 such as what types of documents the users of the document analysis system are most interested in. Such insights may be utilized to improve the performance (including speed or accuracy) of the document analysis system by, for example, constructing general or specific models for such documents of interest.

It will be noted from the above discussion that in document analysis systems 101 that have many tag definitions 111 (e.g., and thus associated datasets 155) the training of representation model 171 may not be a trivial task. Moreover, as will be realized, in some scenarios which it is desired to find similar codes 153, no dataset 155 associated with that code 153 may yet exist. Such is the case, for example, when a user adds a tag definition 111 with a code 153 but no documents 107 have yet been coded for that tag definition. But it is in precisely these cases that a user may desire to find other similar existing codes 153 to boost a newly defined code 153. Accordingly, it would be desirable to be able to represent codes 153 in the representation space, even when datasets for those codes 153 were not utilized in the training of the representation model 171 (e.g., because the code 153 had no or few documents 107 in an associated dataset 155 or for other reasons, such as the code 153 was not selected for use in training the representation model 171, or for some other reason).

Therefore, in some embodiments, code similarity engine 190 may include a proxy representation assigner 180 adapted to determine a proxy numerical representation 168 for a code 153n in the representation space defined by representation model 171 even in the absence of any positive or negative signal documents 107 associated with a code 153 (e.g., an empty dataset 155n). Such a proxy numerical representation assignment may be accomplished based on a feature set 154n associated with that code 153n and a proxy representation machine learning model 173 trained on codes 153 having previously assigned numerical representations 158 in the representation space and an associated feature set 154. Such a feature set 154 may be, for example, one or more globally stable features, comprising, for example, terms or other features extracted from a textual description associated with those codes. Such features 154 may have been provided, for example, when a user defines a tag definition 111 associated with a code 153.

It will be noted here that any number of features of various kinds may be used in addition to, or instead of, a textual description in order to determine a proxy numerical representation. For example, a user might select some number of other codes in the system for which representations are known with the representations for these other codes taken in aggregate becoming features that can be used to determine a proxy representation. Other embodiments may present users with a bank of questions about the code, with the answers to the bank of questions becoming features representing the code, either as free text answers or as one or more choices from a fixed list for each question. In still other embodiments, the proposed code may have properties represented in digital form that are known prior to positive or negative examples being determined, and these properties may be processed in arbitrary ways in order to generate features for producing a proxy representation. It may be understood that according to embodiments features in the context of training a proxy representation model are independent of positive and negative signals.

To illustrate in more detail, in some embodiments a proxy representation assigner 180 may include a ML model builder 182 that trains proxy representation machine learning 173 model (e.g., a parameterized machine learning model such as Logistic Regression, Linear Discriminant Analysis, Perceptron, Naive Bayes or Neural Network machine learning model) on the features 154 and (numerical) representations 158 (e.g., as determined using representation model 171) associated tag definitions 111 (and codes 153) of the document analysis system 101 to predict a point or location in the representation space associated with the representation model 171 (e.g., a numerical representation) based on a set of features 154. In particular, the proxy representation assigner 180 may obtain the features 154 and associated numerical representation 158 determined for each of a set of codes 153 based on representation model 171. These features 154 and associated numerical representations 158 can then be used by ML model builder 182 to train the proxy representation machine learning model 173. Accordingly, this proxy representation model 173 may be applied to a set of features 154n associated with a code 153n to determine a proxy numerical representation 168 for that code 153n. This proxy numerical representation 168 may be a predicted numerical representation in the representation space defined by the representation model 171 based on the set of features associated with that code 153n. In this manner, a proxy numerical representation 168 associated with a code 153n may be used in the same manner as a numerical representation 158 determined for other codes from the representation model 171 and may be used to manipulate the code 153n in the same manner as the numerical representation 158 determined for the other codes 153, including, for example, to compare the code 153n to the other codes 153.

To express embodiments mathematically, suppose that an assignment function α(i, k) has been generated for a given set of tag definitions or associated codes 153 or datasets 155 as discussed. Suppose further that some subset of the $T_{i,k}$ is elaborated with a set of features $x_{i,k}$ (e.g., which are stable across the tag definitions 111, codes 153 and corpora 109). For example, $x_{i,k}$ might be user added text describing the purpose or function of $T_{i,k}$. Then a proxy assignment function $\alpha'(i,k)=\alpha'(x_{i,k}; \theta_\alpha)$ can be trained as a parameterized machine learning model to predict the results of the assignment process based on the features $x_{i,k}$. So if a new corpus or tag definition with a code $C_n$ is introduced with a label $T_{n,k}$ and features $x_{n,k}$, then the proxy assignment $\alpha(n,k)=\alpha'(x_{n,k}; \theta_\alpha)$ can be applied to the features $x_{n,k}$ to generate an assigned representation for $T_{n,k}$ through the invocation of the proxy representation machine learning model 173 rather than using what may be a more onerous assignment process involving the retraining of the representation model 171 underlying α(i,k). This saves time and resources and allows for the simple extension of the assignment function to cover new corpora, tag definitions and codes not seen before or which have insufficient datasets or which otherwise may not have been used to train the representation model 171.

Thus, for example, when a new code 153n is received (e.g., when that code or label is being defined by a user of document analysis system 101), a user may be prompted for, or otherwise provide, a set of features 154 associated with that code 153n. Based on those features, the proxy representation model 173 can be applied and a proxy numerical representation 168 in the representation space associated with the representation model 171 obtained for the new code 153n from the application of the proxy representation model 173. This proxy representation 168 for the new code 153n may be used to leverage capabilities of the document analysis system 101 associated with such representations 158, 168 for codes 153 even in the absence of any positive or negative examples associated with the new code 153n and, importantly, without the need to re-train the original representation model 171. Thus, for example, a proxy representation 168 for a code 153n may be utilized to determine one or more other similar codes 153 based on the representations 158 associated with the other codes 153 of the document analysis system 101.

The numerical representations 158, 168 (e.g., as determined from representation model 171 or proxy representation model 173) associated with codes 153 (e.g., datasets 155) of a document analysis system may thus be used for a variety of purposes. As discussed, as but one use, the representations 158, 168 may be used to determine similar representations and thus similar codes 153 (e.g., and datasets 155). Such an identification may allow the augmentation or combination of datasets 155, allowing better or more accurate models (e.g., classifiers) to be trained and utilized by document analysis systems. Such boosting of codes 153 is described, for example, in patent application Ser. No. 16/881,274, entitled "System and Method for Artificial Intelligence Driven Document Analysis, Including Automated Reuse of Predictive Coding Rules Based on Management and Curation of Datasets or Model", filed by Lockett et al on May 22, 2020 and hereby incorporated by reference herein in its entirety.

As another usage, the representations 158, 168 generated for codes 153 may be used to perform clustering within the representation space in order to identify similar codes 153 or to find regions of density of such codes 153 with the representation space. The numerical representations 158, 168 may define points in a representation space that can be utilized as a map of the codes 153 (e.g., their datasets 153) that exist with respect to the document analysis system 101. These maps, regions of density or similarity of datasets 155 (e.g., associated with codes 153) may be used to make determinations or decisions regarding the development of classifiers that may serve common coding needs, either across corpora 109 or across tenants of a document analysis system 101. Or, more generally, to perform data mining on the corpora 109 themselves such that organizations may better understand their datasets or the composition of those datasets.

As yet another possible usage of representations 158, 168 of codes 153, these numerical representations 158, 168 may be used to identify a drift of codes 153 or their associated datasets 155 over time. For example, if the representations 158, 168 of a code 153 at a first time differs in a significant amount from the representations 158, 168 of that dataset at a second time, or two codes 153 were associated with similarly located representations 158, 168 begin to drift apart it may indicate an issue with the review or coding of such datasets 155 or something else amiss with those datasets 155 or codes 153, or the review of such datasets 155 or codes 153.

Figure 2:
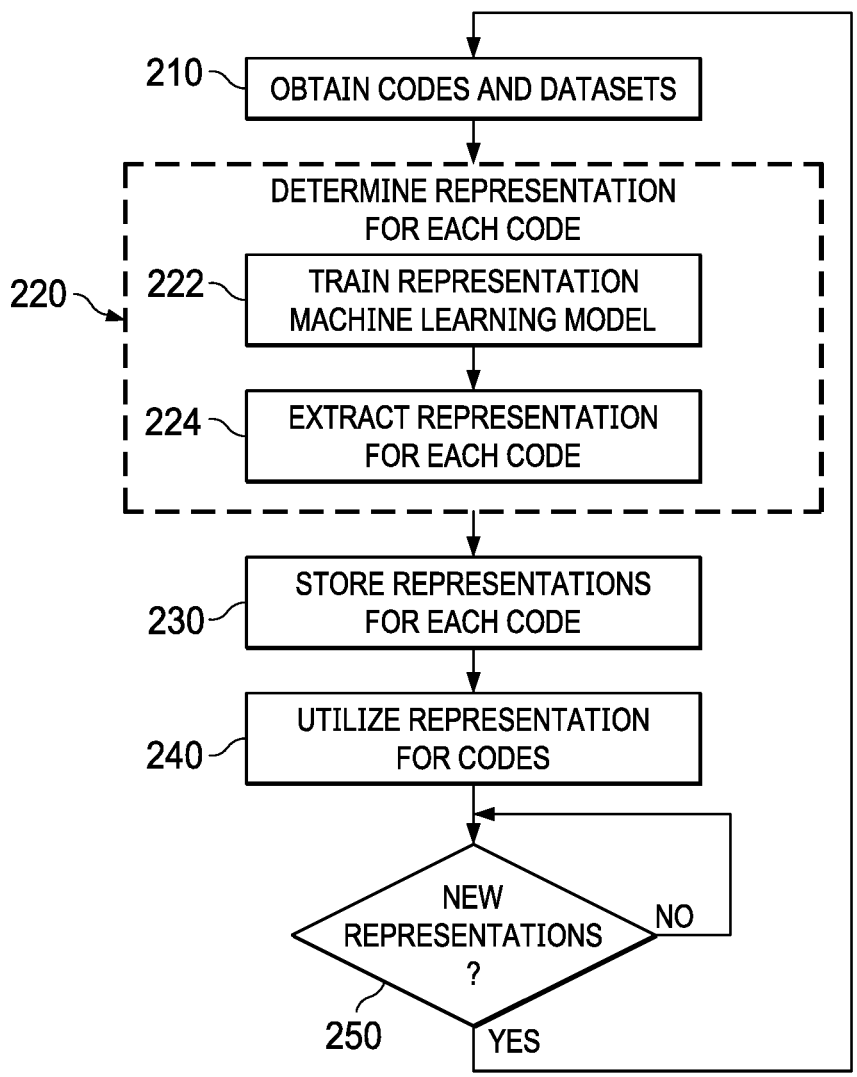
FIG. 2 is a flow diagram of one embodiment of a method for the determination of an extracted representation for a code or dataset.

Turning now to FIG. 2, a flow diagram for one embodiment of a method that may be employed by a document analysis system to determine numerical representations for a set of codes is depicted. Initially, to determine these numerical representations for the set of codes, each of the set of codes and the associated datasets for each of the set of codes for which numerical representations are to be determined may be obtained (STEP 210). The dataset for each of these codes may comprise positive or negative signals for the associated code. In other words, each document of the dataset for the code comprising a positive signal for a code may include an annotation or other indication that the document has been coded or tagged with the associated code (e.g., by a human reviewer), while each document of the dataset comprising a negative signal for the code may include an annotation or other indication that the document should not be coded or tagged with the associated code (e.g., by a human reviewer).

A representation for each of the codes can then be determined based on the datasets associated with each code (STEP 220). Specifically, in one embodiment a parameterized machine learning model such as a Logistic Regression, Linear Discriminant Analysis, Perceptron, Naive Bayes or Neural Network machine learning model may be trained using each of the set of codes and the associated signal documents of their datasets to produce a representation model adapted to predict a document's membership in one or more of the set of codes (STEP 222). Specifically, in one embodiment, a deep neural network may be utilized and trained on the signal documents of the datasets of each the set of codes. This training process results in a neural network model comprising nodes adapted to determine if a document should be classified according to one or more of the set of codes.

The parameters of the trained parameterized representation model associated with each code of the set of codes can then be extracted or converted to the numerical representation for that code (STEP 224). For example, in embodiments where the representation model is neural network, the weights and biases of the representation model may be adapted to discern or contrast the set of codes (e.g., the datasets associated therewith) such that documents can be associated with one or more of the set of codes. Accordingly, the weights and the bias of the trained neural network representation model associated with each code of the set of codes may be extracted from the trained neural network representation model based on those weights and the biases associated with that code, and that numerical representation assigned to that code. In this manner, by training a representation model for each code based on the datasets of each code, a numerical representation for each of those codes may be determined from such a representation model.

The representations extracted for each of the codes from the trained representation model may then be stored in association with the respective code (STEP 230) and utilized by the document analysis system for a variety of purposes as discussed herein (STEP 240). At some point, it can be determined if new representations for codes are to be determined (e.g., and thus a new representation machine learning model is to be trained) (STEP 250). This determination can be made based on a time based criteria, based on a user interaction, based on a number of codes or size of datasets, or on some other criteria altogether. If it is determined that new representations are to be determined (Y Branch of STEP 250), the method may begin again by obtaining a set of codes (e.g., the same or a different set of codes) and their associated datasets (STEP 210).

Figure 3:
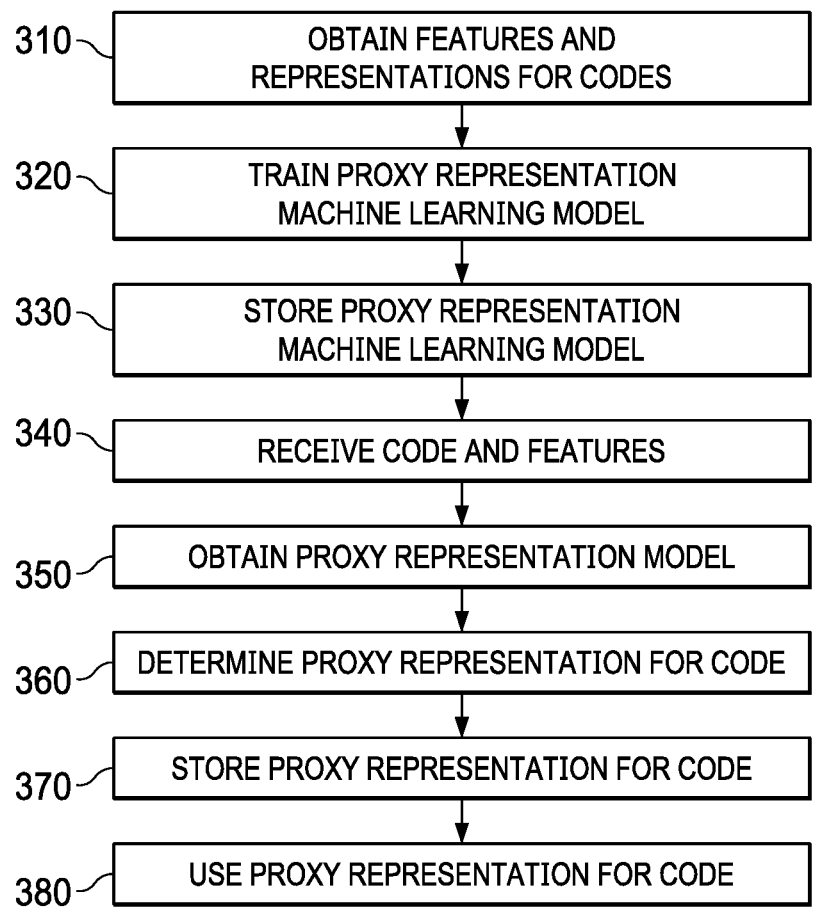
FIG. 3 is a flow diagram of one embodiment of a method for the determination of a proxy representation for a code or dataset.

FIG. 3 depicts a flow diagram for one embodiment of a method that may be employed by a document analysis system to determine numerical representations for one or more codes, where those representations comprise proxy representations for those codes. Initially, to determine proxy numerical representations for any code, a set of proxy training codes for which numerical representations have been previously determined using a representation model (e.g., as discussed above with respect to FIG. 2) may be obtained, along with a set of features associated with each of those codes (STEP 310). Such features for these proxy training codes may be, for example, terms or other features extracted from a textual description associated with those proxy training codes. Such features may have been provided, for example, when a user defined a tag definition associated with these proxy training codes.

Based on the features associated with each of these proxy training codes and the associated numerical representation for each of the proxy training codes as determined from the representation model, a proxy representation machine learning model can be trained such that the proxy representation machine learning model is adapted to predict a numerical representation associated with the representation model (e.g., in the representation space defined by the representation model) based on a set of features (STEP 320). In particular, according to an embodiment a proxy representation machine learning model may be a parameterized machine learning model such as Logistic Regression, Linear Discriminant Analysis, Perceptron, Naive Bayes or Neural Network machine learning model trained on the features and representations associated with each of the set of proxy training codes. This trained proxy representation model can then be stored for future use by the document analysis system (STEP 330).

At some point then, a code may be received along with a set of features associated with the code (STEP 340). This may occur, for example, when a user defines a tag definition or the code associated with a document analysis system, when the user utilizes functionality of the document analysis system to, for example, associate codes or determine similar codes, or for some other purpose. In any event, when such a code is received along with the features, the proxy representation model can be obtained (STEP 350) and applied to the set of features of the received code to determine a proxy representation for that code (STEP 360). That proxy representation for that code may be stored in association with that code (STEP 370) and utilized by the document analysis system for a variety of purposes in substantially a similar manner as a representation determined for a code from the representation model utilized by the document analysis system (STEP 380).

Figure 4:
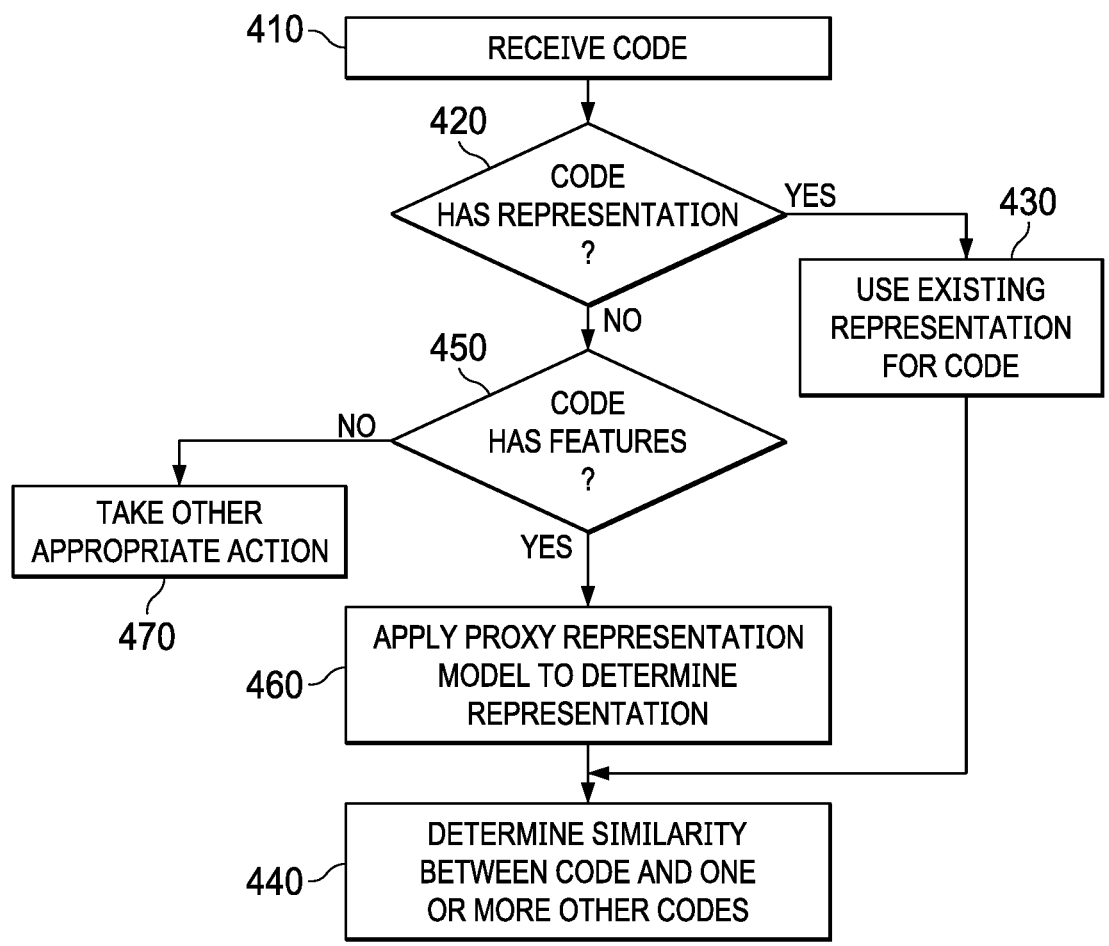
FIG. 4 is a flow diagram of one embodiment of the use of representations of codes or datasets in a document analysis system.

Looking then at FIG. 4, one embodiment of a method for the use of representations of codes in a document analysis system is depicted. Here a code of interest may be obtained (STEP 410). This code may, for example, be a new code being defined by a user or an existing code in the document analysis system. This code of interest may, for example, be a code that a user wishes to determine one or more other similar codes that exist in the document analysis system for purposes of code boosting or for another reason. When the code of interest is obtained it can then be determined if the code has an associated previously determined representation (STEP 420). For example, in one embodiment it may be determined if the code has an associated existing representation as determined from a representation model. If the code has an existing representation (Y Branch of STEP 420), that existing representation may be utilized (STEP 430) and the similarity to one or more other codes determined by comparing this existing representation to the representations (e.g., as extracted from representation model or proxy representations) of one or more other codes (STEP 440).

If the code of interest does not have an existing representation (N Branch of STEP 420), it can be determined if the code has an associated set of features (STEP 450). These features may, for example, be stored in association with the code or provided by a user when defining the code. If the code of interest has associated features (Y Branch of STEP 450) the proxy representation model may be obtained and applied to the set of features of the code of interest to determine a proxy representation for the code of interest (STEP 460). The proxy representation for the code of interest can then be utilized to determine similarity to one or more other codes by comparing the proxy representation for the code of interest to the representations (e.g., as extracted from representation model or proxy representations) of one or more other codes (STEP 440). If the code of interest does not have any associated features (N Branch of STEP 450) an appropriate action may be taken (STEP 470) such as requesting features for the code of interest from the user or returning an error message to the user.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system for document analysis comprising:
   a processor;
   a data store, comprising a corpus of electronic documents; and
   a non-transitory computer readable medium comprising instructions for:
   obtaining a first set of codes, each code associated with a dataset comprising a positive signal or a negative signal for the code, the positive signal or negative signal associated with an electronic document of the corpus of electronic documents;
   training a representation model using each of the first set of codes, wherein training the representation model comprises training a first machine learning model using the datasets associated with each of the first set of codes such that the representation model is adapted to predict membership in one or more of the first set of codes;
   extracting a representation from the representation model for each of the first set of codes, wherein each extracted representation for a respective code is in a representation space defined by the representation model;
   storing the representation extracted for each code of the first set of codes in association with that respective code;
   receiving a first code of interest;
   obtaining a first representation associated with the first code of interest; and
   comparing the first code of interest with a second code to determine a similarity between the first code of interest and the second code, wherein the comparison applies a similarity function associated with the representation space to the first representation associated with the first code of interest and a second representation associated with the second code.

2. The system of claim 1, wherein the first machine learning model is a parametrized model and the extracted representation for the respective code is based on one or more parameters of the parametrized model associated with the respective code.

3. The system of claim 2, wherein the parametrized model is a neural network and the one or more parameters include a weight or bias of the neural network.

4. The system of claim 1, wherein the instructions are further for:
   obtaining a set of training codes of the first set of codes, each training code associated with a set of features and the respective extracted representation;
   training a proxy representation model using each of the set of training codes, wherein training the proxy representation model comprises training a second machine learning model using the set of features associated with each of the set of training codes such that the proxy representation model is adapted to determine a proxy representation in the representation space based on the set of features;
   storing the proxy representation model;
   receiving a second code of interest and the set of features associated with the second code of interest;
   applying the proxy representation model to determine the proxy representation for the second code of interest based on the set of features; and
   comparing the second code with the second code of interest to determine a similarity between the second code and the second code of interest, wherein the comparison applies the similarity function associated with the representation space to the second representation associated with the second code and the proxy representation associated with the second code of interest.

5. The system of claim 4, wherein the second machine learning model is a regression model.

6. The system of claim 4, wherein the set of features comprises a text description.

7. A method, comprising:
   obtaining a first set of codes, each code associated with a dataset comprising a positive signal or a negative signal for the code, the positive signal or negative signal associated with an electronic document of a corpus of electronic documents;
   training a representation model using each of the first set of codes, wherein training the representation model comprises training a first machine learning model using the datasets associated with each of the first set of codes such that the representation model is adapted to predict membership in one or more of the first set of codes;
   extracting a representation from the representation model for each of the first set of codes, wherein each extracted representation for a respective code is in a representation space defined by the representation model;
   storing the representation extracted for each code of the first set of codes in association with that respective code;
   receiving a first code of interest;
   obtaining a first representation associated with the first code of interest; and
   comparing the first code of interest with a second code to determine a similarity between the first code of interest and the second code, wherein the comparison applies a similarity function associated with the representation space to the first representation associated with the first code of interest and a second representation associated with the second code.

8. The method of claim 7, wherein the first machine learning model is a parametrized model and the extracted representation for the respective code is based on one or more parameters of the parametrized model associated with the respective code.

9. The method of claim 8, wherein the parametrized model is a neural network and the one or more parameters include a weight or bias of the neural network.

10. The method of claim 7, further comprising:
obtaining a set of training codes of the first set of codes, each training code associated with a set of features and the respective extracted representation;
training a proxy representation model using each of the set of training codes, wherein training the proxy representation model comprises training a second machine learning model using the set of features associated with each of the set of training codes such that the proxy representation model is adapted to determine a proxy representation in the representation space based on the set of features;
storing the proxy representation model;
receiving a second code of interest and the set of features associated with the second code of interest;
applying the proxy representation model to determine the proxy representation for the second code of interest based on the set of features; and
comparing the second code with the second code of interest to determine a similarity between the second code and the second code of interest, wherein the comparison applies the similarity function associated with the representation space to the second representation associated with the second code and the proxy representation associated with the second code of interest.

11. The method of claim 10, wherein the second machine learning model is a regression model.

12. The method of claim 10, wherein the set of features comprises a text description.

13. A non-transitory computer readable medium, comprising instructions for:
obtaining a first set of codes, each code associated with a dataset comprising a positive signal or a negative signal for the code, the positive signal or negative signal associated with an electronic document of a corpus of electronic documents;
training a representation model using each of the first set of codes, wherein training the representation model comprises training a first machine learning model using the datasets associated with each of the first set of codes such that the representation model is adapted to predict membership in one or more of the first set of codes;
extracting a representation from the representation model for each of the first set of codes, wherein each extracted representation for a respective code is in a representation space defined by the representation model;
storing the representation extracted for each code of the first set of codes in association with that respective code;
receiving a first code of interest;
obtaining a first representation associated with the first code of interest; and
comparing the first code of interest with a second code to determine a similarity between the first code of interest and the second code, wherein the comparison applies a similarity function associated with the representation space to the first representation associated with the first code of interest and a second representation associated with the second code.

14. The non-transitory computer readable medium of claim 13, wherein the first machine learning model is a parametrized model and the extracted representation for the respective code is based on one or more parameters of the parametrized model associated with the respective code.

15. The non-transitory computer readable medium of claim 14, wherein the parametrized model is a neural network and the one or more parameters include a weight or bias of the neural network.

16. The non-transitory computer readable medium of claim 13, wherein the instructions are further for:
obtaining a set of training codes of the first set of codes, each training code associated with a set of features and the respective extracted representation;
training a proxy representation model using each of the set of training codes, wherein training the proxy representation model comprises training a second machine learning model using the set of features associated with each of the set of training codes such that the proxy representation model is adapted to determine a proxy representation in the representation space based on the set of features;
storing the proxy representation model;
receiving a second code of interest and the set of features associated with the second code of interest;
applying the proxy representation model to determine the proxy representation for the second code of interest based on the set of features; and
comparing the second code with the second code of interest to determine a similarity between the second code and the second code of interest, wherein the comparison applies the similarity function associated with the representation space to the second representation associated with the second code and the proxy representation associated with the second code of interest.

17. The non-transitory computer readable medium of claim 16, wherein the second machine learning model is a regression model.

18. The non-transitory computer readable medium of claim 16, wherein the set of features comprises a text description.

* * * * *